US005280860A

United States Patent [19]
Kataoka

[11] Patent Number: 5,280,860
[45] Date of Patent: Jan. 25, 1994

[54] CONTAINER FOR DEVELOPED PHOTOGRAPHIC FILM

[75] Inventor: Hideaki Kataoka, Kanagawa, Japan

[73] Assignee: Fuji Photo Film Co., Ltd., Kanagawa, Japan

[21] Appl. No.: 910,914

[22] Filed: Jul. 8, 1992

[30] Foreign Application Priority Data

Jul. 8, 1991 [JP] Japan ............................ 3-193431

[51] Int. Cl.⁵ ............................................. G03B 27/62
[52] U.S. Cl. .................................. 242/71.1; 354/275; 355/75
[58] Field of Search ................... 242/71.1, 55.53; 206/408, 409, 389, 397, 407, 411; 354/275; 355/75; 352/78 R

[56] References Cited

U.S. PATENT DOCUMENTS

| | | | |
|---|---|---|---|
| 2,329,989 | 9/1943 | Hilquist | 242/71.1 |
| 3,323,744 | 6/1967 | Chesley et al. | 354/275 X |
| 3,752,302 | 8/1973 | Branibar | 206/409 |
| 4,179,028 | 12/1979 | Stemme et al. | 206/389 X |
| 4,221,479 | 9/1980 | Harvey | 242/71.1 X |
| 5,083,155 | 1/1992 | Kataoka et al. | 242/71.1 X |

FOREIGN PATENT DOCUMENTS 837962 3/1970 Canada .................... 242/71.1

Primary Examiner—Daniel P. Stodola
Assistant Examiner—John F. Rollins
Attorney, Agent, or Firm—Sughrue, Mion, Zinn, Macpeak & Seas

[57] ABSTRACT

A box-shaped container for photographic film has an outer casing and a cover. When the cover is opened, an inner casing with a cylindrical film roll chamber can be removably inserted in the outer casing. After a trailing end of the developed photographic film is anchored to a core, the core is inserted in a lateral direction into the film roll chamber. Then, disks are fitted on both lateral ends of the core. When the inner casing is inserted into the outer casing, the core is supported rotatably by the outer casing. The developed photographic film is wound on the core completely in a roll. The disks serve to limit the diameter of the rolled developed photographic film, which enables rotation of the core to be transmitted to an outermost turn of the developed photographic film, whereby a leading end of the developed photographic film is advanced out of the outer casing through the inner casing.

15 Claims, 7 Drawing Sheets

CONTAINER FOR DEVELOPED PHOTOGRAPHIC FILM

BACKGROUND OF THE INVENTION

1. Field of the Invention

The present invention relates to a container for containing photographic film after development.

2. Description of the Related Art

In a photofinishing laboratory, exposed 35 mm photographic film is pulled out from a photographic film cassette and developed by a film processor. The developed photographic film is then sent to a photographic printer in order to obtain photoprints from original frames of the developed photographic film. After printing, the developed photographic film is cut, e.g., after every six frames, into film pieces. Each film piece is then inserted into a pocket of a film sheath. This film sheath is folded at portions between the pockets and returned to the customer together with the photoprints. Other size photographic films are processed in a similar manner.

As the film pieces in the film sheath cannot be folded, a relatively large amount of space is required for storage of the sheath. Also, it is difficult to sort and store a plurality of film sheaths in a desired order. Accordingly, the film sheaths are liable to get scattered and lost, which causes difficulty when extra prints of frames in the film pieces are desired.

In the photofinishing laboratory the use of sheaths is not efficient, since an inserting operation is necessary in addition to the cutting operation. Also, fingerprints, dust particles and scratches are often imparted to the film pieces during the inserting operation.

SUMMARY OF THE INVENTION

It is therefore an object of the present invention to provide a container for developed photographic film capable of containing the developed photographic film efficiently.

It is another object of the present invention to provide a container for developed photographic film which allows convenient storage and sorting of the developed photographic film.

It is still another object of the present invention to provide a container for developed photographic film which allows extra prints to be made easily.

To achieve the above and other objects, a container of the present invention has a box-shaped casing with an opening formed at an upper side thereof and a cover for closing the opening. A trailing end of the developed photographic film is anchored to a core, which is then inserted in the casing while the cover open. The core is held rotatably inside the casing. When rotating the core from the outside of the casing, the developed photographic film is wound on the core in a roll. Accordingly, the developed film is contained in the casing. When extra prints are required, the core may be rotated in an unwinding direction to cause the roll of developed photographic film to rotate together with the core. During this rotation, a leading end of the developed photographic film is separated from the film roll, and advanced toward the outside of the casing through a cutout of the casing.

A pair of disks are fitted on both ends of the core. When inserted into the casing, the disks are positioned in a stationary manner. The disks each have circumferential lips formed thereon for preventing the roll of developed photographic film from loosening by holding both sides of the outermost turn of the roll. Cut-offs are formed on the lips for allowing the developed photographic film to pass therebetween. At least one of the disks has a separating guide at the cut-off which separates a leading end of the developed photographic film from the film roll and guides it toward the cutout of the casing.

In a preferred embodiment, an approximately box-shaped inner casing is removably inserted in the casing. The inner casing has a cylindrical film roll chamber and a film passage slit. After the core with the trailing end of the developed photographic film anchored thereto is inserted in the film roll chamber from the lateral direction, the disks are fitted on both ends of the core. In this condition, the inner casing is inserted in the casing.

Various constructions can be used for the above-mentioned cover. One is a slidable cover which is opened and closed slidably with respect to the casing. The cutout of the casing is exposed to the outside when the slidable cover is closed. Also, a two-part cover, consisting of a first cover for closing the cutout of the casing and a second cover for closing the upper opening of the casing, may be utilized. The first cover is pivotally connected to the second cover. Further, the second cover is mounted pivotally on the rear side of the casing or mounted slidably relative to the casing.

According to the present invention, photographic film can be contained in the containers in a roll in photofinishing laboratories, and can be stored in a small space and sorted easily as compared with the conventional manner in which film sheaths are used. Also, it is possible to eliminate the cutting operation of developed photographic film resulting in a higher operational efficiency. Furthermore, developed photographic film is easily pulled in and out of the containers so that extra printing can be performed easily.

BRIEF DESCRIPTION OF THE INVENTION

The above objects and advantages of the present invention will become more apparent from the following detailed description when read in connection with the accompanying drawings in which.

DETAILED DESCRIPTION OF THE INVENTION

Figure 1:
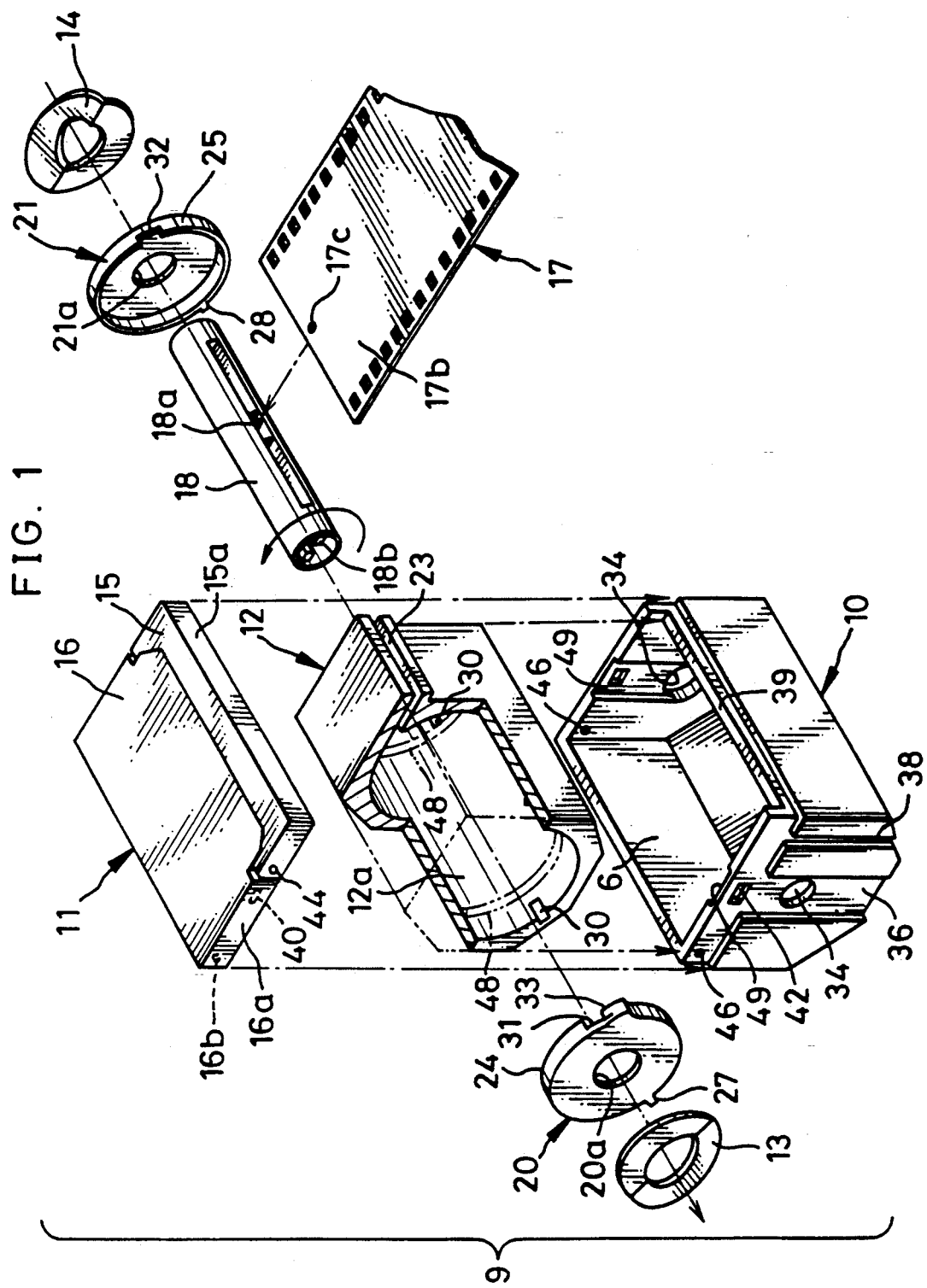
FIG. 1 is an exploded perspective view of a container for a developed photographic film of a preferred embodiment of the present invention.

In FIG. 1 illustrating a first preferred embodiment of the present invention, a container 9 has an outer casing 10 and a cover 11 openably mounted on the outer casing 10. The outer casing 10 is substantially box-shaped and has a storing chamber 16 to accommodate an inner casing 12. The inner casing 12 has a cylindrical film chamber 12a for containing developed 35 mm photographic film in a roll.

The developed photographic film 17 is provided at its trailing end with a hole 17c by which the developed photographic film 17 is anchored to a projection 18a of a core 18. The developed photographic film 17 is wound on the core 18 in a roll. A pair of disks 20 and 21 are fitted on both ends of the core 18 through holes 20a and 21a. The inner casing 12 contains the core 18, and the disks 20 and 21 fitted thereon, with the developed photographic film 17 wound in a roll on the core 18.

The inner casing 12 has a slit 23 through which the developed photographic film 17 is pulled in and out of the inner casing 12. Circumferential lips 24 and 25 project from peripheries of the disks 20 and 21 inwardly in an axial direction of the core 18, and hold the outermost turn of the rolled developed photographic film 17 at both lateral ends of the developed photographic film 17. This serves to limit the diameter of the roll of developed photographic film 17 to prevent it from loosening. The disks 20 and 21 are formed integrally with respective projections 27 and 28 which are fitted in grooves 30 formed on a wall of the film chamber 12a to prevent the disks 20 and 21 from rotating. Further, the disks 20 and 21 are urged toward the developed photographic film 17 by spring washers 13 and 14 bent in a V-shape so as to make the distance between the disks 20 and 21 approximately equal to the width of the developed photographic film 17. It is to be noted that if the length of grooves 30 is equal to that of the projections 27 and 28, the spring washers 13 and 14 may be omitted.

Figure 2:
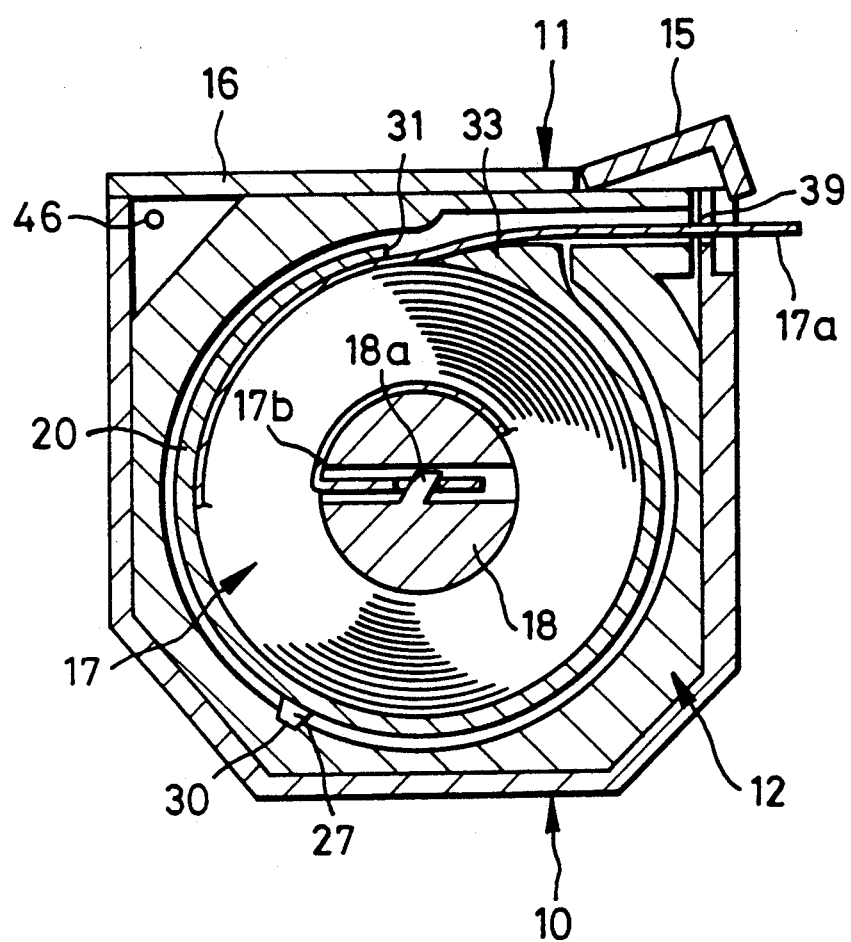
FIG. 2 is a cross section of the container as shown in FIG. 1 in which a first cover is opened.

The circumferential lips 24 and 25 are formed with cut-offs 31 and 32 which face the slit 23 of the inner casing 12 so as to allow the developed photographic film 17 to pass therethrough. As illustrated in FIG. 2, the disk 20 has a claw-like separating guide 33 at an end portion of the cut-off 31 for peeling off a leading end 17a of the rolled developed photographic film 17 and guiding it toward the slit 23. When the rolled developed photographic film 17 is rotated together with the core 18 by rotation of the core 18 and the leading end 17a reaches the cut-offs 31 and 32, the leading end 17a is separated by the separating guide 33 and led toward the slit 23 through the cut-offs 31 and 32. Thus an inner casing assembly is constituted of the inner casing 12, the core 18, the disks 20 and 21, and the spring washers 13 and 14.

The storing chamber 6 of the outer casing 10 has guide grooves 49 formed in its lateral side surfaces rotatably supporting both lateral ends of the core 18. The guide grooves 49 have holes 34 through which keying ribs 18b of the core 18 are exposed to the outside of the outer casing 10. Both lateral outside surfaces of the outer casing 10 are provided with recessed portions 36. Also, one lateral outside surface thereof has a groove 38 through which an opening pin, to be described in detail below, is inserted so as to open a forepart cover 15. A cutout 39 is formed in the outer casing 10 at a position corresponding to the slit 23 to provide a passageway for the developed photographic film 17.

Figure 3:
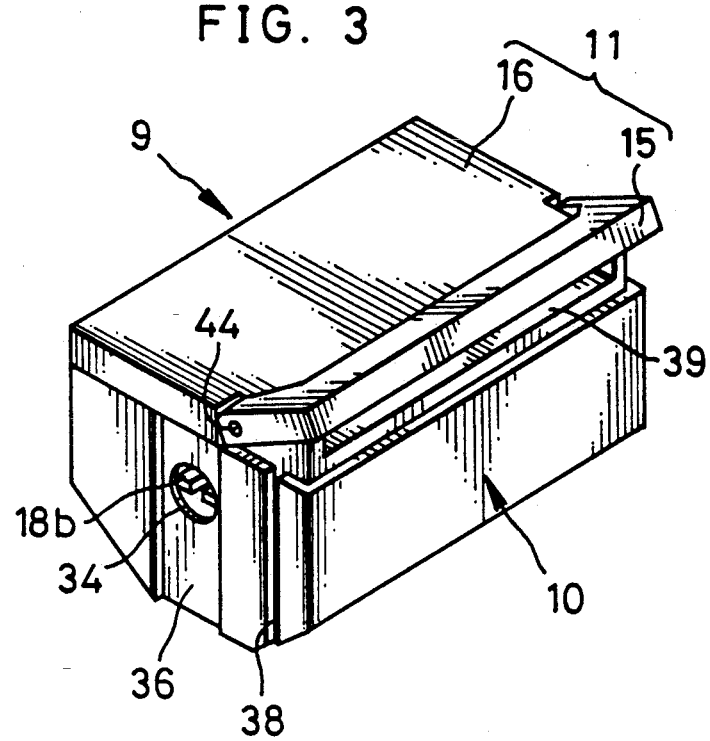
FIG. 3 is a perspective view of the container in which the first cover is opened.

The cover 11 consists of the forepart cover 15 and a rearpart cover 16. The forepart cover 15 is opened to expose the cutout 39 when pulling the developed photographic film 17 out of and into the container 9. The rearpart cover 16 is opened when inserting the inner casing assembly into the outer casing 10. The cover 11 may be removably attached to the outer casing 10. Ridges 15a and 16a project downward from the entire peripheries of the respective forepart and rearpart covers 15 and 16, except at a position proximate the connected portions thereof, to contact an upper outer surface of the storing chamber 16. The forepart cover 15 is opened when advancing the leading end 17a of the developed photographic film 17 out of the container 9 by rotating the core 18 in a film advancing direction. The forepart cover 15 is attached pivotally to the rearpart cover 16. This attachment is performed by a press-fit insertion of pins 44 of the rear part cover 16 into holes of the forepart cover 15 as illustrated in FIGS. 1 and 3. Of course, hinges may also be used.

The ridge 16a of the rearpart cover 16 has protrusion 16b on both rearward lateral inside surfaces. The cover 16 is mounted swingably to the outer casing 10 by inserting the protrusions 16b into holes 46 formed correspondingly in both rearward lateral outside surfaces of the outer casing 10. Claws 40 are provided on both forward lateral inside surfaces of the rearpart cover 16 and fitted in holes 42 formed in both lateral outside surfaces of the outer casing 10 so that the rearpart cover 16 cannot be easily opened.

Next, a procedure for initially containing the developed photographic film 17 in the container 9 will be described. In a photofinishing laboratory, a plurality of exposed photographic films 17 are spliced end to end in order to perform film developing and printing processes efficiently. After these processes, the resultant sliced developed photographic films are separated one by one to each developed photographic film 17. At this time, a hole 17c is formed in a trailing end 17b of the developed photographic film 17 so as to anchor the developed photographic film 17 on the core 18.

After the trailing end 17b is anchored on the core 18, the core 18 is inserted in the inner casing 12 from the axial direction while the developed photographic film 17 is passed through the slit 23. The disks 20, 21 and the spring washers 13, 14 are then fitted on both ends of the core 18 such that both lateral edges of the developed photographic film 17 are positioned in the cut-offs 31 and 32 and the projections 27 and 28 are fitted in the grooves 30 of the inner casing 12.

Figure 4:
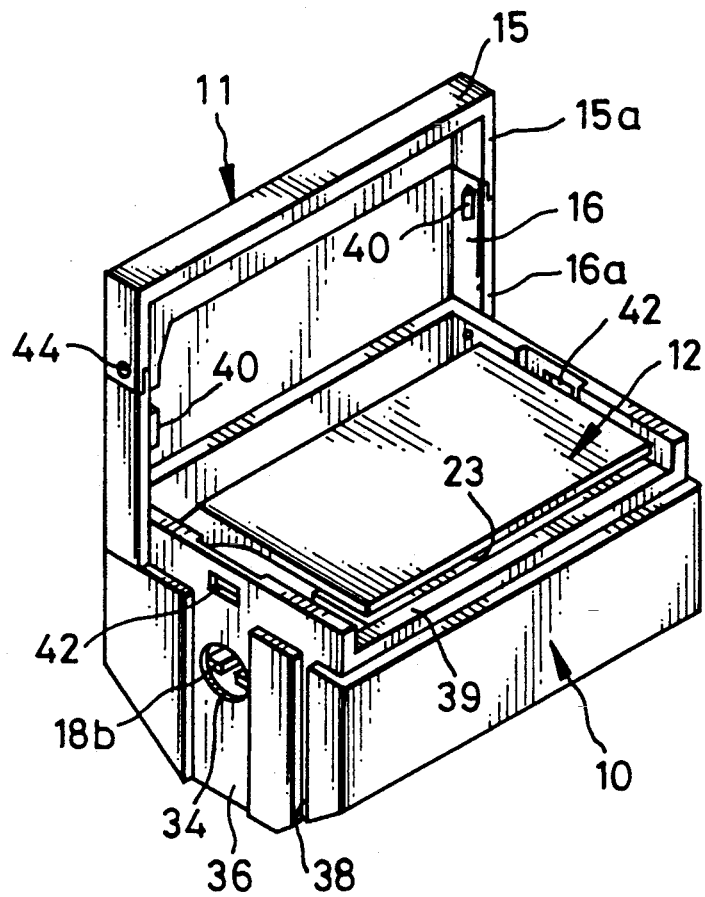
FIG. 4 is a perspective view of the container in which a second cover is opened.

As illustrated in FIG. 4, the cover 11 is swung open so as to form right angles with respect to the outer casing 10. The inner casing assembly is inserted in the outer casing 10 from the upper opening. After a keying rib 18b of the core 18 is coupled with a drive shaft (not shown), the core 18 is rotated in a film winding direction (counterclockwise in FIG. 1) to wind the developed photographic film 17 into the inner casing 12. This rotation of the core 18 may be carried out by a jig, or the like.

When the developed photographic film 17 is completely wound into the inner casing 12, the circumferential lips 24 and 25 are in contact with the outermost turn of the rolled developed photographic film 17 at both lateral ends to limit the diameter of the rolled developed photographic film 17, thus preventing loosening of the rolled developed photographic film 17. As illustrated by two-dot-dash lines in FIG. 1, annular ridges 48 may be provided on the inside surface of the inner casing 12 for preventing the loosening of the rolled developed photographic film 17, instead of the disks 20 and 21. In that case, the annular ridges 48 are provided so as to be in contact with areas where perforations of the developed photographic film 17 are arranged. The inside diameter of the annular ridges 48 is approximately equal to the inside diameter of the circumferential lips 24 and 25. Of course, both the disks 20, 21 and the annular ridges 48 can be used as the film advancing structure.

After the film winding operation is completed, the cover 11 is swung to fit on the outer casing 10 with the claws 40 engaged in the holes 42. At this time, the forepart cover 15 closes the cutout 39 of the outer casing 10. When using the container 9 for containing the developed photographic film 17, it is possible to store the developed photographic film 17 in a compact manner as compared with conventional film sheath. Therefore, it is very convenient for a customer to store and sort the photographic film 17. Also, because the upper and bottom surfaces of the container 9 are flat, as opposed to rounded, it is possible to pile a number of the containers 9 on top of each other, which also contributes to easy storing and sorting.

Figure 5:
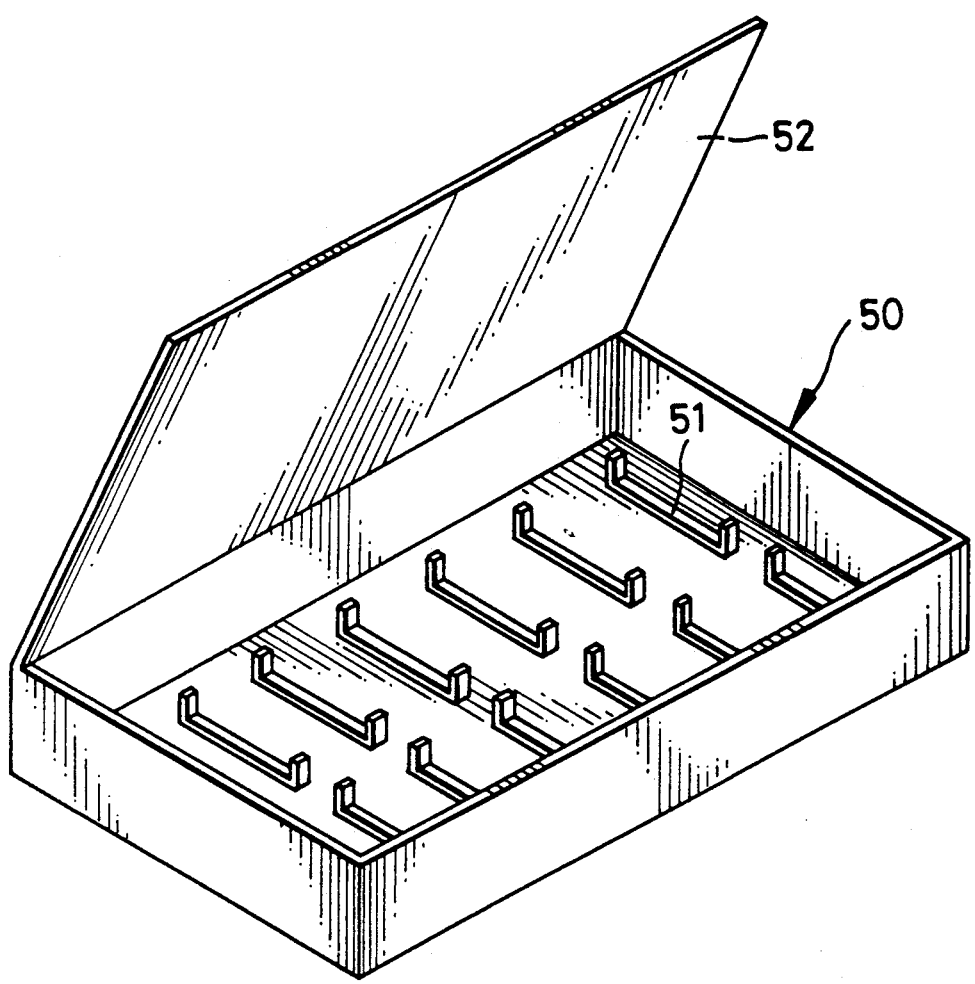
FIG. 5 is a perspective view of a storage box for storing the container in a printer.

A storage box 50 as illustrated in FIG. 5 allows the customer to store and sort a plurality of containers 9. The storage box 50 has a lid 52 and a plurality of holders 51 which are provided inside bottom of the storage box 50 and are adapted to hold the containers 9. The holders 51 are made of thin plates having ends which are bent at right angles. The holders 51 can be manufactured at a low cost. The distance between the bent portions of the holders 51 is determined so as to fittingly receive the recessed portions 36 of the outer casing 10. Also, the width of the holders 51 is formed to be fitted in the recessed portions 36. When closed, the lid 52 prevents up and down movement of the containers 9 positioned on the holders 52, which makes it possible to easily transport a number of containers 9.

In the photofinishing laboratory, it is possible to automate the winding operation of the developed photographic film 17 in the container 9, which can enhance operational efficiency. Furthermore, it is possible to eliminate troublesome operations such as cutting the developed photographic film 17 into a film pieces and inserting them in a film sheath. During the winding operation, the developed photographic film 17 scratches due to dust and the like, will not be formed since the winding operation is performed speedily.

Figure 6:
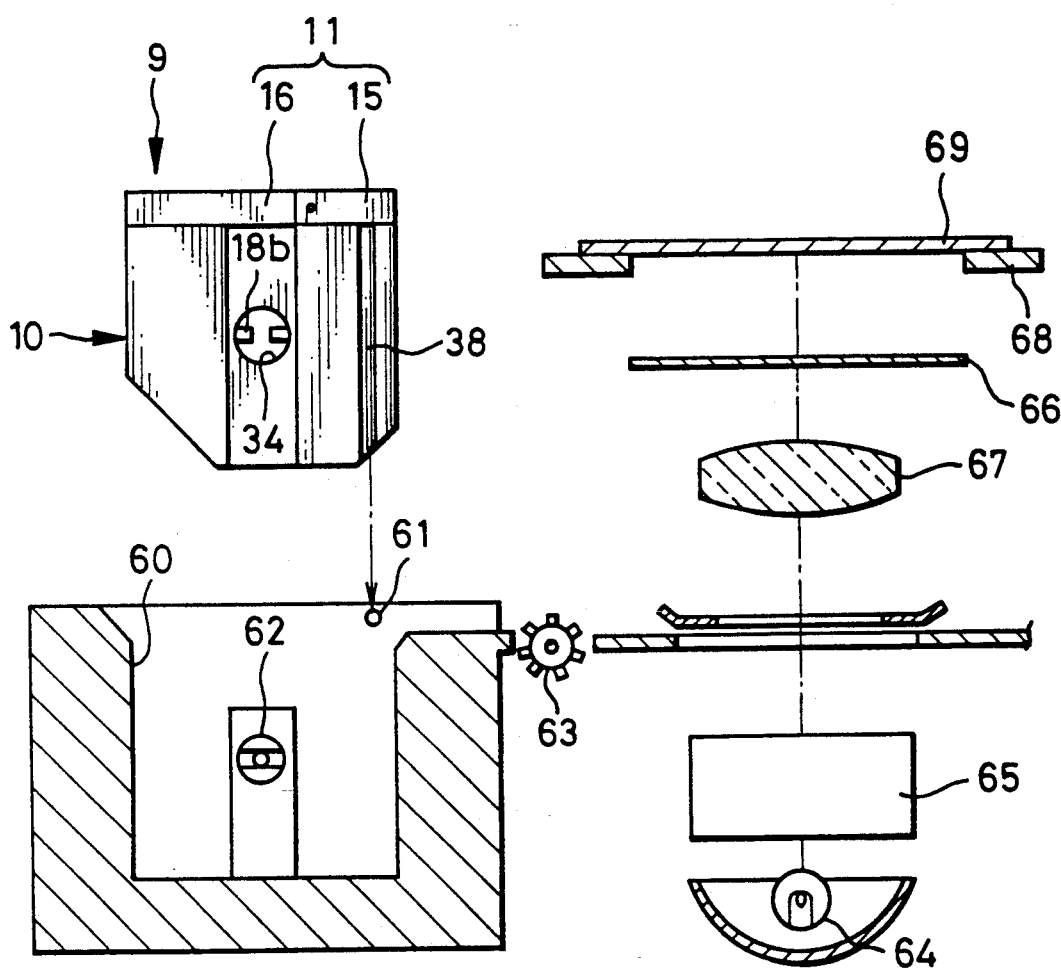
FIG. 6 is a schematic showing the container in a photoprinting apparatus.

FIG. 6 schematically illustrates a procedure for obtaining extra photoprints of the developed photographic film 17 in the container 9 upon receiving a customer order. When the container 9 is inserted into a container receiving portion 60 of a printer, an opening pin 61 enters the groove 38 of the outer casing 10 and pushes the forepart cover 15 up as shown in FIG. 2. At this time, the rearpart cover 16 will not be opened since the claws 40 are engaged in the holes 42. The keying ribs 18b of the core 18 are then coupled with a coupling 62 of the printer. Accordingly, the leading end 17a of the developed photographic film 17 can be advanced out of the container 9 by rotating the coupling 62 clockwise in FIG. 6. The leading end 17a is engaged with a sprocket 63, by which thereafter the developed photographic film 17 is advanced. It is to be noted that the inner casing 12 remains stationary within the outer casing 10 since the upper surface of the inner casing 12 is in full contact with the rearpart cover 16.

In an extra printing process, light from a lamp 64 is adjusted by a light adjusting device 65 including a mirror-box and color compensating filters so as to illuminate a desired frame, in a conventional manner. Then, the frame is printed on the photographic paper 69 through a printing lens 67 and mask 68 by opening a shutter 66 for a predetermined time. When the coupling 62 is rotated counterclockwise in FIG. 6 after the extra printing process, the developed photographic film 17 is once again wound into the container 9. The container 9 is taken out of the container receiving portion 60 of the printer and the opening pin 61 slides out of the groove 38, resulting in the closing of the forepart cover 15. Needless to say, it is possible to configure the container 9 for video players having a scanner to pick a particular frame on the developed photographic film 17. In that case, the opening pin 61 is provided in a container accommodating portion of the video player.

In this embodiment, the forepart and rearpart covers 15 and 16 are formed separately. However, they may be formed integrally. In that case, the forepart cover portion can be formed integrally with the rearpart cover portion and a boundary therebetween can be formed to be thinner so as to allow the forepart cover portion to pivot with respect to the rearpart cover portion.

Figure 7:
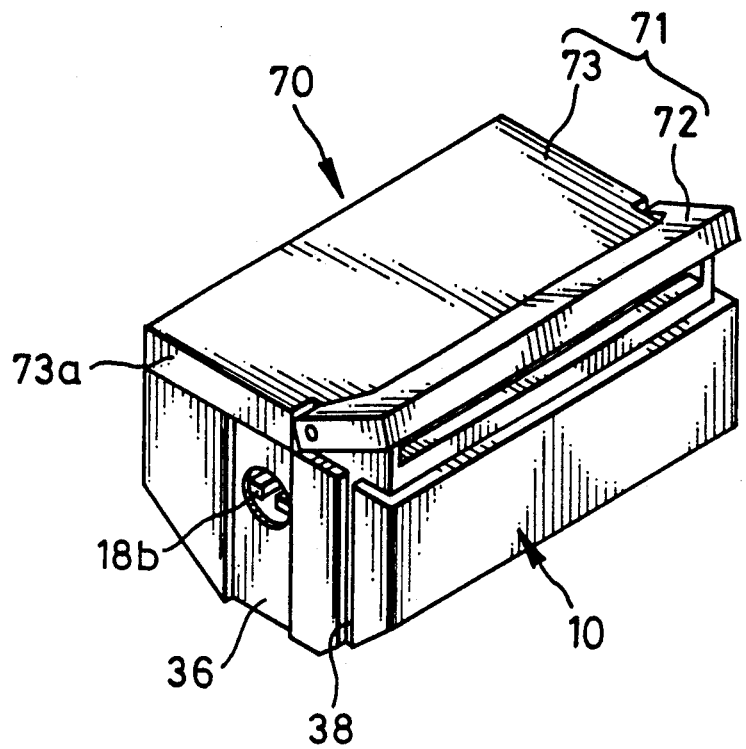
FIG. 7 is a perspective view of a container for the developed photographic film of a second preferred embodiment, in which the first cover is opened.
Figure 8:
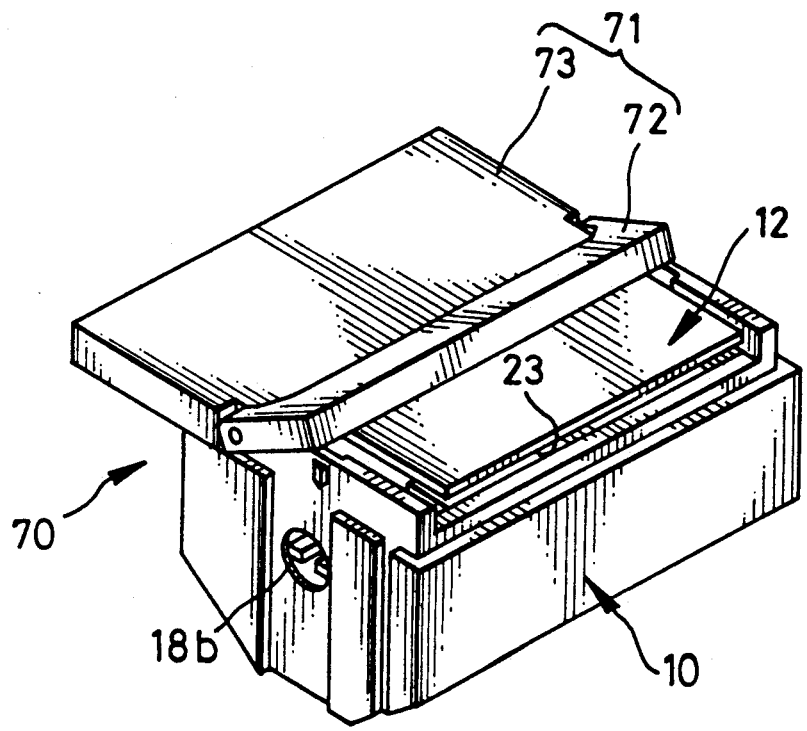
FIG. 8 is a perspective view of the container of FIG. 7, in which the second cover is slidably opened.

FIGS. 7 and 8 illustrate a second preferred embodiment of the present invention. Elements similar to those in the first embodiment are designated by like reference numerals. A container 70 has an outer casing 10, an inner casing assembly including the inner casing 12 and a cover 71. The cover 71 consists of a forepart cover 72 and rearpart cover 73 which are connected to each other in the same manner as in the first embodiment. The rearpart cover 73 is mounted so as to be slidably opened in a direction perpendicular to the axis of the core 18 (not illustrated). In this case, the opening and closing of the rearpart cover 73 can be performed reliably by providing engagement members between corner portions of each lateral inside surface of the ridge 73a and corresponding positions of the outer casing 10. When the developed photographic film (not illustrated) is pulled out of, and wound into, the container 70, the forepart cover 72 is opened, as illustrated in FIG. 7. When the inner casing assembly is inserted in the outer casing 10, the rearpart cover 73 is slid rearward, as illustrated in FIG. 8.

Figure 9:
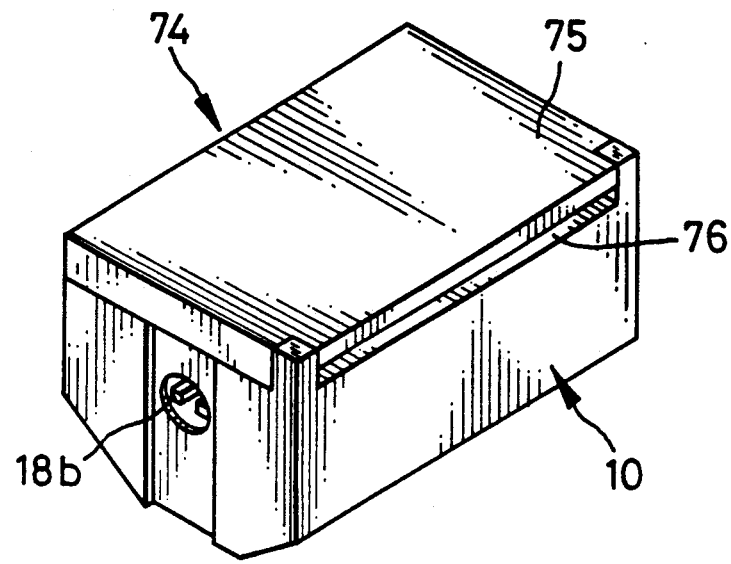
FIG. 9 is a perspective view of a container for a developed photographic film of a third preferred embodiment.
Figure 10:
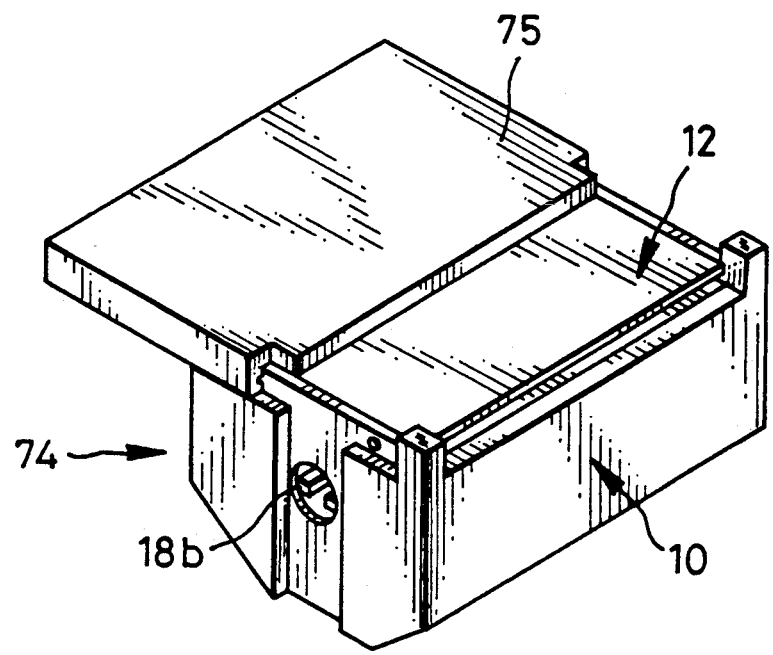
FIG. 10 is a perspective view of the container of FIG. 9, in which the cover is slidably opened.

FIGS. 9 and 10 illustrate a container 74 according to a third embodiment of the present invention. The cover 75 is integrally formed as one body in contrast to the embodiments above. The container 74 is provided with a film passage opening 76 which is defined between the cover 75 and the outer casing 10 even when the cover 75 is closed. Therefore, there is no need to open the cover 75 in order to advance the developed photographic film 17 out of the container 74. The cover 75 is slid to be opened entirely in the same manner as in the second embodiment shown in FIGS. 7 and 8 when the inner casing assembly is accommodated in the outer casing 10.

The inner casing 12 is used in the above embodiments, however, the inner casing 12 is not necessarily required. When not using the inner casing 12, the outer casing 10 should be provided with grooves on inside surfaces thereof into which the projections 27 and 28 of the disks 20 and 21 are fitted in.

If the container is transparent, such a design might be convenient since the inside thereof can be observed. However, when the container has light shielding characteristics, long-term preservation of the developed photographic film can be ensured without deterioration thereof due to light. In order to impart light-shielding characteristics to the container, it is necessary to select proper materials for the construction of the container. Accordingly, it is preferably to injection mold the container by using thermoplastic resin having a light-shielding substance added thereto.

It is desirable to use black pigments such as carbon black and graphite, black dye, metal powder and aluminum paste as the light-shielding substance. Also, it is desirable to use polystyrene resin, ABS resin and polyolefin resin as the thermoplastic resin since these are inexpensive and easily injection molded. The polyolefin resin includes high-density polyethylene resin, homopolypropylene resin, propylene α olefin random copolymer resin and propylene α olefin block copolymer resin.

It is especially suitable to use, as a main component, thermoplastic resins such as HIPS, various polypropylene resins (homopolypropylene resin, propylene ethylene copolymer random resin and propylene ethylene copolymer resin) and mixture resin blended with more than one type of resin selected from among HIPS, various polypropylene resins, various ethylene copolymer resins or synthetic rubber.

In the case where the forepart and rearpart covers are integrally formed with a thinner boundary portion therebetween, it is suitable to use a polypropylene system resin compound mixed with one or more resins selected from among various ethylene copolymer resins and various synthetic rubber in order to strengthen the thinner boundary portion.

Although particular materials suitable for the construction of the container are indicated above, thermoplastic resins other than those indicated above can be used if injection molding is possible. It is effective to add various types and amounts of additives in order to improve and retain desired characteristics of substances for the container according to particular application. Representative additives will be discussed below, however, this discussion should not be construed as limiting.

It may be desirable to use plasticizers, stabilizers, fire retardant additives, fillers, reinforcers, foaming agents, vulcanizing agents, antideteriorating agents, coupling agents, and nucleating agents as additives. The plasticizer can be selected from among phthalic acid ester, glycolester, ester of fatty acid and phosphoric ester. The stabilizer can be selected from among lead system, cadmium system, zinc system, cadmium system, zinc system, alkaline earth metal system, and organotin system types. The fire retardant additive can be selected from among phosphoric ester, phosphoric ester halogenide, halogenide, oxygen free compounds, and phosphorus-containing polyol. The filler can be selected from among alumina, kaolin, clay, calcium carbonate, mica, talc, barium sulfate, titanium oxide and silica. The reinforcer can be selected from among glass roving, metal fiber, glass fiber, milled glass fiber and carbon fiber. The foaming agent can be selected from among inorganic blowing agents, ammonia carbonate, sodium bicarbonate and organic blowing agents (nitrogen system and azo system). The vulcanizing agent can be selected from among rubber accelerators and supplement accelerators. The antideteriorating agent can be selected from among antioxidant, ultraviolet light absorber, metal inactivating agent and peroxide decomposer. The coupling agent can be selected from among silane system, titanate system, chrome system and aluminum system types. The nucleating agent can be selected among an organic nucleating agent (dibenzylidene sorbitol compound) and an inorganic nucleating agent (calcium carbonate).

In the above embodiments, the container is used for containing the developed 35 mm photographic negative film. However, the container can also be used for containing a developed photographic reversal film.

While the invention has been described in detail above with reference to preferred embodiments, various modifications within the scope and spirit of the invention will be apparent to people of working skill in this technological field. Thus, the invention should be considered as limited only by the scope of the appended claims.

What is claimed is:

1. A container for containing a developed photographic film, comprising:

a core adapted to hold said developed photographic film thereon in a roll, a trailing end of said developed photographic film being anchored to said core;

an outer casing for rotatably containing said core, said outer casing being substantially box-shaped and having a first opening at a first side thereof, said first side extending along an axial direction of said core, said first opening being large enough to allow said core to pass therethrough;

said outer casing having a pair of guide grooves formed therein and extending from said first opening approximately to the center of said outer casing so as to receive both ends of said core respectively therein, each of said grooves communicating with a respective hole formed in said outer casing, said holes being axially aligned with said core when said core is fully inserted into said outer casing and allowing rotation of said core ends from the outside of said outer casing;

a film guiding device coupled to at least one of said outer casing and said core so as to guide a leading end of the outermost turn of said roll of developed photographic film to the outside of said outer casing; and a cover for closing said first opening of said outer casing.

2. A container as recited in claim 1, wherein said outer casing includes a cutout formed along the edge of a surface of said outer casing so as to define a passageway for said developed photographic film.

3. A container as recited in claim 2, further comprising an inner casing disposed in said outer casing which has a cylindrical film roll chamber formed therein and a film passage slit facing said cutout, said film roll chamber containing said roll of said developed photographic film wound on said core.

4. A container as recited in claim 3, wherein said film guiding device is a pair of annular ridges formed on an inner wall of said inner casing, said annular ridges contacting the outermost turn of said roll of said developed photographic film to prevent said roll of said developed photographic film from loosening.

5. A container as recited in claim 3, wherein said film guiding device is a pair of disks which are fitted on both ends of said core so as to prevent said roll of developed photographic film from loosening, said disks being secured to said inner casing so as to allow said core to rotate relative to said disks.

6. A container as recited in claim 5, each of said disks comprising:
- a projection which is adapted to being fitted in a groove formed on an inside wall of said inner casing so as to prevent relative rotation between said disks and said inner casing;
- a circumferential lip formed on a periphery of said disk to prevent said roll of said developed photographic film from loosening by contacting side portions of an outermost turn of said roll of developed photographic film; and
- a cut-off formed in a portion of said circumferential lip so as to allow said developed photographic film to pass therethrough.

7. A container as recited in claim 6, wherein a separating guide is formed on one of said disks so as to protrude therefrom, said separating guide separating a leading end of said developed photographic film from said roll of said developed photographic film when said core is rotated and guiding said leading end toward said film passage slit.

8. A container as recited in claim 7, further comprising a pair of spring washers disposed between said inner casing and said disks so as to urge said disks toward said roll of said developed photographic film.

9. A container as recited in claim 7, wherein an engagement mechanism is formed on said cover and said outer casing so as to attach said cover to said outer casing when said cover is moved to a closed position for closing said first opening.

10. A container as recited in claim 9, wherein said cover is slidable relative to said outer casing and said output of said outer casing is exposed when said cover is in said closed position.

11. A container as recited in claim 9, wherein said cover consists of a first cover for closing said cutout of said outer casing and a second cover for closing said first opening of said outer casing.

12. A container as recited in claim 11, wherein said first cover is pivotally connected to said second cover.

13. A container as recited in claim 12, wherein said outer casing has a groove formed therein for receiving an opening pin associated with a processing device, said opening pin opens said first cover by engaging with said first cover when the opening pin is moved to an inserted position.

14. A container as recited in claim 13, wherein said second cover is mounted pivotally on a rear side of said outer casing.

15. A container as recited in claim 13, wherein said second cover is slidably mounted to said outer casing.

* * * * *